(12) United States Patent
Shen et al.

(10) Patent No.: US 9,119,188 B2
(45) Date of Patent: Aug. 25, 2015

(54) METHOD, APPARATUS AND COMMUNICATION SYSTEM FOR REQUESTING RESOURCE

(75) Inventors: Gang Shen, Shanghai (CN); Dongyao Wang, Shanghai (CN); Wu Zheng, Shanghai (CN); Xiaobing Leng, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 10 days.

(21) Appl. No.: 13/142,175

(22) PCT Filed: Jan. 4, 2009

(86) PCT No.: PCT/CN2009/000002
§ 371 (c)(1),
(2), (4) Date: Jun. 24, 2011

(87) PCT Pub. No.: WO2010/075654
PCT Pub. Date: Jul. 8, 2010

(65) Prior Publication Data
US 2011/0255502 A1    Oct. 20, 2011

(51) Int. Cl.
*H04W 72/04* (2009.01)
*H04W 72/12* (2009.01)

(52) U.S. Cl.
CPC ...... *H04W 72/0406* (2013.01); *H04W 72/1242* (2013.01); *H04W 72/1278* (2013.01); *H04W 72/042* (2013.01)

(58) Field of Classification Search
USPC .......................................... 370/329; 455/437
See application file for complete search history.

(56) References Cited

U.S. PATENT DOCUMENTS
5,493,569 A    2/1996   Buchholz et al.
7,436,801 B1  10/2008   Kanterakis
(Continued)

FOREIGN PATENT DOCUMENTS
CN    1105509 A    7/1995
CN    1567776 A    1/2005
(Continued)

OTHER PUBLICATIONS

International Search Report for PCT/CN2009/000002 dated Oct. 1, 2009.
(Continued)

*Primary Examiner* — Michael Thier
*Assistant Examiner* — Yaotang Wang
(74) *Attorney, Agent, or Firm* — Fay Sharpe LLP

(57) ABSTRACT

The present invention discloses a method of requesting resource from a resource allocating apparatus by a request requesting apparatus, a resource allocating apparatus, a resource requesting apparatus and a communication system. The method comprises the following steps: sending a resource request message from the resource requesting apparatus to the resource allocating apparatus; after receiving the resource request message, if resource cannot be allocated within a set time interval with respect to the resource requesting apparatus, sending an acknowledgement for the resource request message from the resource allocating apparatus to the resource requesting apparatus; and if the resource is allocated to the resource requesting apparatus within the set time interval, not sending the acknowledgement for the resource request message from the resource allocating apparatus to the resource requesting apparatus. Utilizing the method and structure of the present invention, the resource allocating apparatus sends additional acknowledgement message only if needed, therefore overhead is reduced much more. Moreover, since the solution of the present invention does not change any signaling exchanged between the resource allocating apparatus and the resource requesting apparatus, it is able to meet the requirement of backward compatibility.

8 Claims, 5 Drawing Sheets

(56) References Cited

U.S. PATENT DOCUMENTS

| | | | |
|---|---|---|---|
| 2005/0243761 A1* | 11/2005 | Terry et al. | 370/328 |
| 2008/0139207 A1* | 6/2008 | Son et al. | 455/437 |
| 2008/0192674 A1 | 8/2008 | Wang et al. | |
| 2010/0157916 A1* | 6/2010 | Kim et al. | 370/329 |
| 2010/0255850 A1* | 10/2010 | Kaukoranta et al. | 455/450 |
| 2011/0164587 A1* | 7/2011 | Seo | 370/329 |

FOREIGN PATENT DOCUMENTS

| | | |
|---|---|---|
| KR | 100774365 B1 | 11/2007 |
| KR | 10-2009-0016024 | 2/2009 |
| WO | WO 94/21063 | 9/1994 |
| WO | WO 2005/112295 A2 | 11/2005 |
| WO | WO 2008/054114 A2 | 5/2008 |

OTHER PUBLICATIONS

Supplementary European Search Report of European Application No. EP 09835941 dated Oct. 8, 2013.

Qinghua Li, "BW-REQ channel design recommendations for IEEE 802.16m," Document No. IEEE C802.16m-08/635, Jul. 13, 2008, pp. 1-21.

* cited by examiner

METHOD, APPARATUS AND COMMUNICATION SYSTEM FOR REQUESTING RESOURCE

FIELD OF THE INVENTION

The present invention relates to mobile communications, and particularly relates to a method, an apparatus and a communication system for requesting resource, which allows a resource allocating apparatus to acknowledge for a bandwidth request when it receives the resource (bandwidth) request from a resource requesting apparatus and cannot allocate resource timely.

BACKGROUND OF THE INVENTION

In IEEE802.16e, all the uplink services except UGS unsolicited grant service) connection require to request bandwidth from a base station BS. When data in a buffer of a mobile station MS await uplink transmission, the MS will do the above bandwidth request. The bandwidth request refers to a mechanism that the MS indicates to the BS that it needs how large bandwidth to proceed with the corresponding uplink transmission. The bandwidth request of the MS needs to take into account number of bytes to be carried by a MAC (medium access control) PDU (protocol data unit). When the BS receives the bandwidth request from the MS, it will consider available resource and a scheduling scheme to allocate resource to the MS. It is possible that the MS receives a transmission opportunity less than as anticipated, or cannot receive the UL grant from the BS. This might be caused by problems such as scheduling judgment, insufficient resource or missing of the request message. As for a failure to allocation resource matching the MS's requirement, the BS will not provide definite reasons.

FIG. 7 shows a bandwidth request/grant procedure provided in IEEE 802.16e. At step S701, once the MS needs to request a bandwidth, it selects a CDMA ranging code and provides, in a ranging slot for competition, the CDMA ranging code to the BS. At step S702, once the CDMA ranging code is detected, the BS provides CDMA_IE UL allocation information to the MS.

At step 703, the MS sends, in the allocated resource, a bandwidth request message to the BS. Then the BS should reply UL grant at step 704 to allocate the bandwidth resource requested by the MS. If the BS does not send the above UL allocation information, or the bandwidth request does not cause the BS to allocate the corresponding bandwidth in the subsequent steps in a designated time interval, the MS will assume that the bandwidth request fails and filed a bandwidth request again or discard the corresponding SDU.

After the MS sends the bandwidth request, it expects to receive the bandwidth allocation (UL grant) from the BS. However, in some cases the MS may not obtain the expected bandwidth allocation. One reason is that in some adverse network environments, the bandwidth request information might be discarded or destroyed. As shown in FIG. 8, after the sent bandwidth request message gets lost, the MS cannot sent a CDMA competition again unless the timer of the MS overflows. Therefore, the BS cannot correctly receive the bandwidth request message sent by the MS. This causes failure to send the UL grant message desired by the MS to the MS. Another reason relates to scheduling judgment. If the BS thinks that available resource cannot meet all the bandwidth requests, it is likely to decide to delay bandwidth allocation to some specific MSs, e.g., allocate bandwidth to theses MSs in the subsequent frames. As such, the BS can first meet the demands of some time-critical services. Even if the MS does not obtain the corresponding bandwidth allocation, the BS will not give definite explanations to the MS. The MS detects the invalid of the bandwidth request by judging whether the timer overflows. If a latency set by the timer has already passed and the MS does not receive the desired bandwidth allocation, the MS will re-initiate a new CDMA competition.

In the case that the bandwidth request message gets lost, the MS has to wait for an unnecessary period of time (namely, a period of time until the timer overflows) to re-send a bandwidth allocation request. This enlarges the latency of the bandwidth request. If the latency is configured to be relatively short, even if the BS correctly obtains the original request, the MS might re-send a bandwidth request message because the timer might overflow before the BS begins to schedule UL grant to the MS. This causes unnecessary overhead and causes the BS to mistakenly regard it as a new request, as shown in FIG. 9. The reason for this problem is that the BS that receives the bandwidth request message does not acknowledge the receipt of the message.

The IEEE 802.16m work group has already begun to amend the IEEE 802.16 standard in order to increase operation performance in granted channels for air interface. According to the required documents, this proposes stricter requirement for the bandwidth request: shorter latency and less overhead. Therefore, solution to the above problem becomes more important.

At $56^{th}$ meeting of IEEE 802.16 (in July 2008), Intel Corporation proposes a solution (non-patent document 1: IEEE C80216m-08_635, BW-REQ channel design recommendations for IEEE 802.16m, Intel Corporation, Jul. 13, 2008) of enabling the MS to definitely acknowledge whether the BS receives the bandwidth request message to allow for restart of random access as soon as possible.

As shown in FIG. 10, at step 1001, when a buffer of the MS has data to be sent, the MS selects a corresponding ranging code for a CDMA competition. Then, once the BS receives the CDMA competition from the MS, it will carry out a corresponding CDMA_IE allocation, that is, allow the MS to know when or in what resource the MS should send a resource request message.

Thereafter, at step S1003, the MS, at the corresponding instant or resource, sends the resource request message. At step S1004, after the BS receives the resource request message from the MS, it makes a definite acknowledgement. Then, at step S1005, resource is scheduled on the side of the BS to allocate the requested resource to the MS and send it to the MS through UL grant information. At step S1006, once the MS receives the resource allocated by the BS, it will send, on the resource, the data to be sent in the buffer to the BS.

As compared with the procedure in IEEE 802.16e, the solution of the above non-patent document 1 adds the step of acknowledging the bandwidth request (step S1004 in FIG. 10). Once the BS receives the bandwidth request message from the MS, it will definitely provide an acknowledgement message for the request. This enables the MS to quickly re-start random access procedure so as to restore from the unsuccessful bandwidth request as soon as possible. As for the MS, it knows it should receive in next frame the acknowledgement message ACK, which indicates that the BS has already successfully received the bandwidth request message. If the MS does not receive the desired acknowledgement message from the BS, it knows that the previously sent request has gotten lost. Then, the MS re-sends a bandwidth request message, thereby substantially reducing unnecessary latency (namely, a period of time until the timer overflows).

Although the above solution eliminates unnecessary latency on the side of the MS, it still has a drawback, i.e., increasing the overhead. As for each MS request, the BS has to provide some resources to make the ACK response, which at least comprise an MS identification (MS ID) or connection identification and acknowledgement instruction. If it is carried by some message, the message transmission has its own format (header and message body). Therefore, the BS also has to allocate extra resource in MAP IE to inform the MS of where to receive the message. However, with respect to a majority of uplink bandwidth requests, when the BS receives a bandwidth request from a MS, it will timely reply a UL grant message to the MS. The MS can quickly receive the UL grant. In this case, acknowledgement for the bandwidth request becomes useless. Therefore, unnecessary overhead is caused.

SUMMARY OF THE INVENTION

An object present invention is to provide an apparatus and a communication system for requesting resource, which allows a resource allocator to acknowledge for a bandwidth request when it receives the resource (bandwidth) request from a mobile station and cannot allocate the resource timely.

According to a first aspect of the present invention, there is provided a method of a requesting resource from a resource allocating apparatus by a resource requesting apparatus, comprising steps: sending a resource request message from the resource requesting apparatus to the resource allocating apparatus; after receiving the resource request message, if resource cannot be allocated within a set time interval with respect to the resource requesting apparatus, sending an acknowledgement for the resource request message from the resource allocating apparatus to the resource requesting apparatus; and if the resource is allocated to the resource requesting apparatus within the set time interval, not sending the acknowledgement for the resource request message from the resource allocating apparatus to the resource requesting apparatus.

Preferably, if resource cannot be allocated within a set time interval with respect to the resource requesting apparatus, an acknowledgement for the resource request message is sent from the resource allocating apparatus to the resource requesting apparatus by virtue of UL grant.

Preferably, if the resource cannot be allocated to the resource requesting apparatus within the set time interval, a value indicative of the size of resource in the UL grant sent by the resource allocating apparatus is set to be 0.

Preferably, if the resource requesting apparatus receives the acknowledgement for the resource request message sent by the resource allocating apparatus to the resource requesting apparatus in the set time interval, the resource requesting apparatus waits for resource allocation from the resource allocating apparatus.

Preferably, if the resource requesting apparatus does not receive a valid resource allocation or the acknowledgement for the resource request message sent by the resource allocating apparatus to the resource requesting apparatus in the set time interval, the resource requesting apparatus begins to re-send a request for resource.

Preferably, the resource requesting apparatus detects whether the value indicative of the size of resource in the UL grant is 0, and if the value indicative of the size of resource is 0, the resource requesting apparatus waits for the resource allocation from the resource allocating apparatus.

Preferably, the resource at least comprises bandwidth.

According to a second aspect of the present invention, there is provided a resource allocating apparatus, comprising: a transceiving unit for receiving a resource request message from a resource requesting apparatus; a resource scheduling and allocating unit for judging whether to allocate resource to the resource requesting apparatus within the set time interval after the transceiving unit receives the resource request message; an acknowledgement message generating unit for generating a message acknowledging the resource request message if resource cannot be allocated to the resource requesting apparatus in the set time interval; the message acknowledging the resource request message is sent to the resource requesting apparatus via the transceiving unit.

According to a third aspect of the present invention, there is provided a resource requesting apparatus, comprising a transceiving unit for sending a resource request message and receiving a message from the resource allocating apparatus; a detecting unit for detecting whether the received message meets predetermined conditions; the resource requesting apparatus waits for the resource allocation result from the resource allocating apparatus when the detection result indicates the received message meets the predetermined conditions.

According to a fourth aspect of the present invention, there is provided a communication system, comprising the aforesaid resource allocating apparatus and the aforesaid resource requesting apparatus.

As stated above, the present invention employs implicit acknowledgement for the receiving of the bandwidth request message, not the acknowledgement method set forth in the above non-patent document 1. This enables the mobile station to know that the bandwidth request message gets lost so that the mobile station can re-send a bandwidth request message as soon as possible.

In other words, the solution proposed by the present invention can use the scheduling signaling to acknowledge the bandwidth application. If the base station does not allocate resource immediately because of the scheduling scheme, the base station still allocates the UL grant to those mobile stations which request for the bandwidth. However, the size of the allocated resource is for example 0. After the special UL grant is received, the mobile station knows that the base station has already correctly received its bandwidth request, and the only thing is that there is no appropriate resource to allocate currently. Therefore, the mobile station will not attempt to resend a bandwidth request message to avoid redundant repeated request. If the base station decides to immediately allocate resource and send a UL grant response to the mobile station, it will allocate resource according to normal operation procedure without need to send any extra acknowledgment message, thereby reducing the overhead. If the mobile station does not receive any UL grant (the allocated desired resource or 0) within the set time interval after the mobile station sends the bandwidth request, it knows that the bandwidth request gets lost. The mobile station will immediately re-send a bandwidth request, thereby substantially reducing unnecessary latency (namely, a period of time until the timer overflows).

Utilizing the method and structure of the present invention, the base station sends additional acknowledgement message only if needed, therefore overhead is reduced much more. Moreover, since the solution of the present invention does not change any signaling exchanged between the base station and the mobile station, it is able to meet the requirement of backward compatibility.

BRIEF DESCRIPTION OF THE ACCOMPANYING DRAWINGS

Embodiments of the present invention will be described only in an exemplary manner with reference to the accompanying drawings, in which.

DETAILED DESCRIPTION OF THE PREFERRED EMBODIMENTS

The preferred embodiments of the present invention will be described hereunder in detail with reference to the accompanying drawings. Although the same reference numbers are marked in different figures, they denote same or similar components. For the sake of clarity and conciseness, detailed description of known functions and structures included herein and being irrelevant to the subject matter of the present invention will be omitted to prevent them from making the subject matter of the present unclear.

Figure 1:
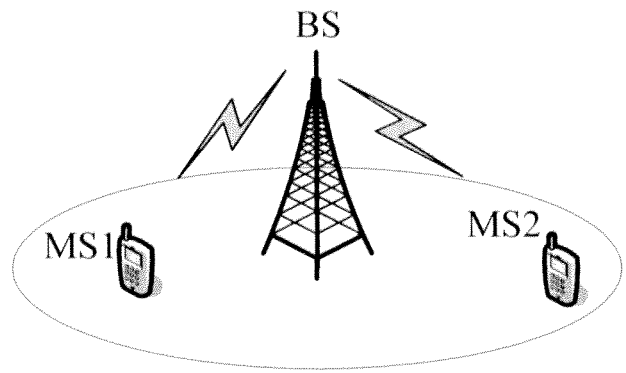
FIG. 1 is a general structural diagram showing a communication system according to an embodiment of the present invention.

FIG. 1 is a general structural diagram showing a communication system according to an embodiment of the present invention. As shown in FIG. 1, the communication system comprises a base station BS and mobile stations MS1 and MS2. Naturally, there also exists a configuration of communication system comprising a plurality of base stations and a plurality of mobile stations.

Figure 2:
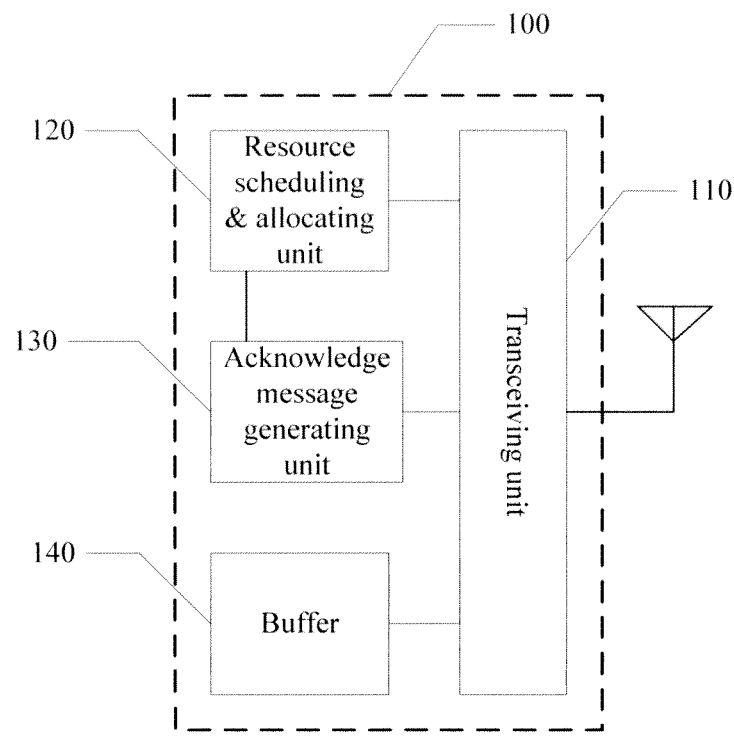
FIG. 2 is a schematic structural block diagram of a base station according to an embodiment of the present invention.
Figure 3:
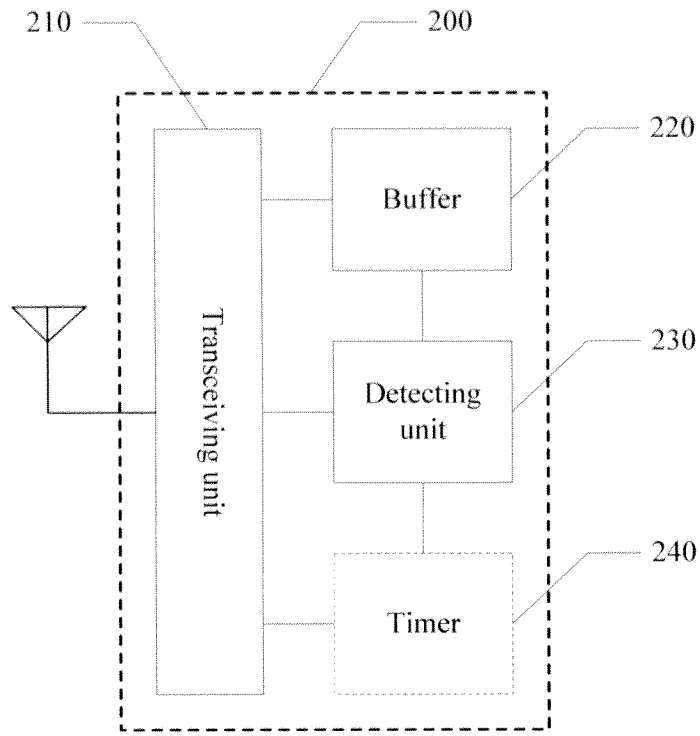
FIG. 3 is a schematic structural block diagram of a mobile station according to an embodiment of the present invention.

FIG. 2 is a schematic structural block diagram of a base station according to an embodiment of the present invention. FIG. 3 is a schematic structural block diagram of a mobile station according to an embodiment of the present invention.

As shown in FIG. 2, a base station 100 according to the embodiment of the present invention comprises a transceiving unit 110, a resource scheduling and allocating unit 120, an acknowledgement message generating unit 130 and a buffer 140. As shown in FIG. 3, a mobile station 200 according to the embodiment of the present invention comprises a transceiving unit 210, a buffer 220 and a detecting unit 230. According to another embodiment, the mobile station further has a timer 240. The specific structure and operation procedure of the above base station and mobile station will be described in detail in combination with specific examples.

Figure 4:
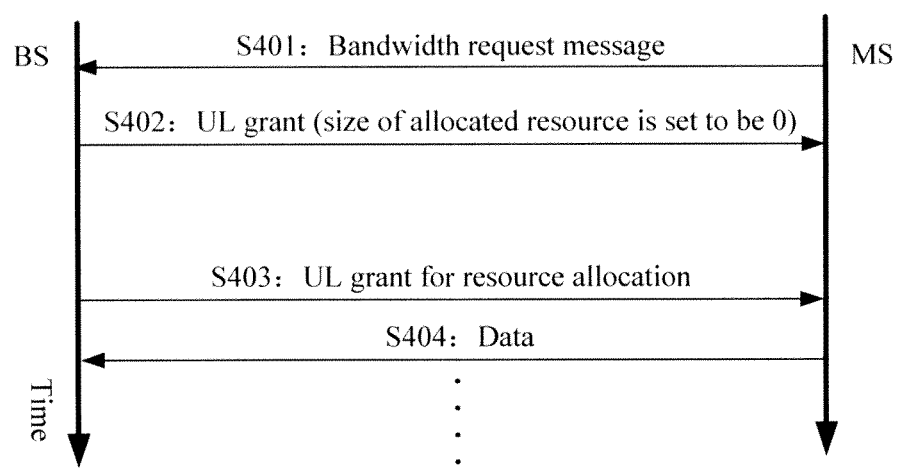
FIG. 4 shows a procedure of acknowledging a bandwidth request according to an embodiment of the present invention.

FIG. 4 shows a procedure of acknowledging a bandwidth request according to an embodiment of the present invention. As for each valid bandwidth request, the base station needs to immediately make a UL grant response irrespective of whether the base station has already made resource scheduling for the base station. The UL grant is sent in an OFDMA UL-MAP IE format. OFDMA UL-MAP IE defines UL bandwidth allocation. The bandwidth allocation is designated either by a block allocation (absolute offset) or a duration in the time slot (relative or absolute time slot offset).

When the buffer 220 of the mobile station 200 has data to be sent, the transceiving unit 2101 mobile station selects an appropriate ranging code for a CDMA competition. The resource scheduling and allocating unit 120 of the base station 100 provides the mobile station 200 with corresponding CDMA_IE UL allocation information. At the position or instant designated by the allocation information, at step S401, the transceiving unit 210 of the mobile station sends a bandwidth request according to the amount of data in the buffer 220 to ask for a certain bandwidth from the base station to send the data.

According to the embodiment of the present invention, upon receipt of the bandwidth request message of the mobile station 200, the resource scheduling and allocating unit of the base station 100 determines whether it can allocate resource to the mobile station immediately. If not, at step S402, the acknowledgement message generating unit 130 sets an identification to a value of a specific field in the UL grant message to be sent to the mobile station. A method is to set the size of the allocated resource to be 0, and then send it to the mobile station via the transceiving unit 110.

In next frame, the mobile station receives the corresponding UL grant, the detecting unit 230 detects the identification of the value of the specific field in the UL grant message, e.g., detects whether the size of the allocated source is 0. If the size is 0, it is indicated that the base station has already successfully received the bandwidth request sent by the mobile station 200. In this case, the mobile station 200 continues to wait without resending a bandwidth request message.

At step S403, in the case that the resource scheduling and allocating unit 120 has appropriate resource that can be allocated to the mobile station 200, it sends to the mobile station 200 the corresponding resource information such as size and position of the bandwidth through the UL grant message. At step S404, the transceiving unit 210 of the mobile station obtains the resource information from the received UL grant message, takes out data to be sent from the buffer 200, and sends, on the resource determined by the resource information, the data to the base station 100.

According to the embodiment of the present invention, if the base station 100 has already, in the current frame, allocated some resource to the mobile station, the resource scheduling and allocating unit 120 of the base station 100 sends the corresponding OFDMA UL-MAP IE according to conventional operation, without need to additionally embed an acknowledgement for the bandwidth request message. OFDMA UL-MAP IE comprises resource allocated according to the solution.

As above stated, in some cases, the base station 100 decides to delay resource allocation to some specific mobile stations, e.g., perform resource allocation for these specific mobile stations in subsequent frames according to the scheduling scheme, which can meet the demand of some time-critical services. As such, the base station 100 still sends the corresponding OFDMA UL-MAP IE to those mobile stations 200 which request bandwidth. However, the acknowledgment message generating unit 130 sets the value indicative of the size of the resource to be 0. Specifically speaking, some fields of OFDMA UL-MAP IE, such as fields of OFDMA symbols (the number of OFDMA symbols for carrying the UL pulse), sub-channel (the number of sub-channels with subsequent indexes) and the duration field (indicative of the allocated time length with OFDMA time slot as unit) should be 0. The base station sends the OFDMA UL-MAP IE in a standard format. Therefore, this can meet the requirement for backward compatibility and doesn't need to define a new message or signaling. If there is no requirement for backward compatibility, the base station optionally sends the OFDMA UL-MAP IE in which an acknowledgement field is embedded.

In the procedure as shown in FIG. 4, if the base station correctly receives the bandwidth request but decides not to allocate resource immediately, the base station will send an acknowledgement field embedded in the UL grant. When the mobile station receives the specific UL grant, it knows that the base station has already correctly received its bandwidth request and therefore waits for resource allocation. The mobile station will not attempt to resend a request to avoid redundant repeated request.

Figure 5:
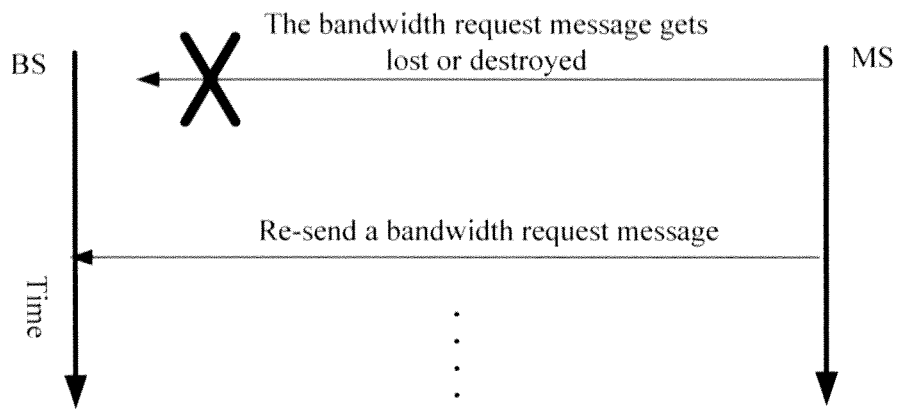
FIG. 5 shows a procedure of re-sending a bandwidth request message when a bandwidth request message gets lost or destroyed according to an embodiment of the present invention.

FIG. 5 shows a procedure of re-sending a bandwidth request message when a bandwidth request message gets lost or destroyed according to an embodiment of the present invention. In this case, the base station 100 does not send any UL grant to the mobile station 200. Since the mobile station 200 cannot receive any UL grant at a desired point of time (e.g., the frame after the bandwidth request is sent), it knows that its own bandwidth request gets lost. The transceiving unit 210 of the mobile station 200 will re-send a bandwidth request immediately, thereby substantially reducing unnecessary latency.

Figure 6:
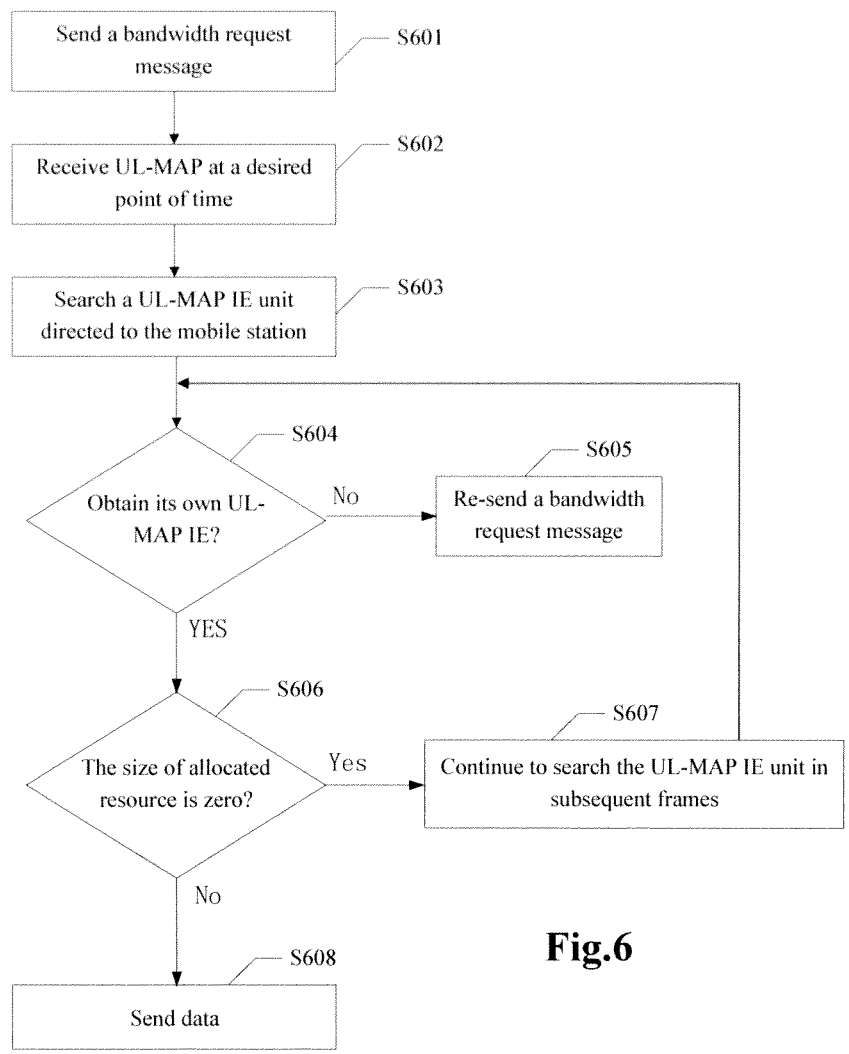
FIG. 6 shows a bandwidth request/grant procedure according to an embodiment of the present invention.
Figure 7:
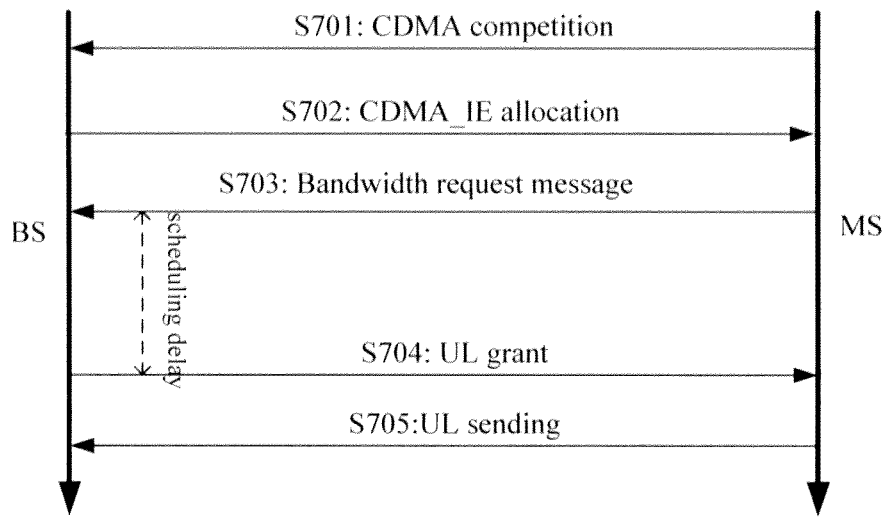
FIG. 7 shows a bandwidth request/grant procedure defined in IEEE 802.16e.
Figure 8:
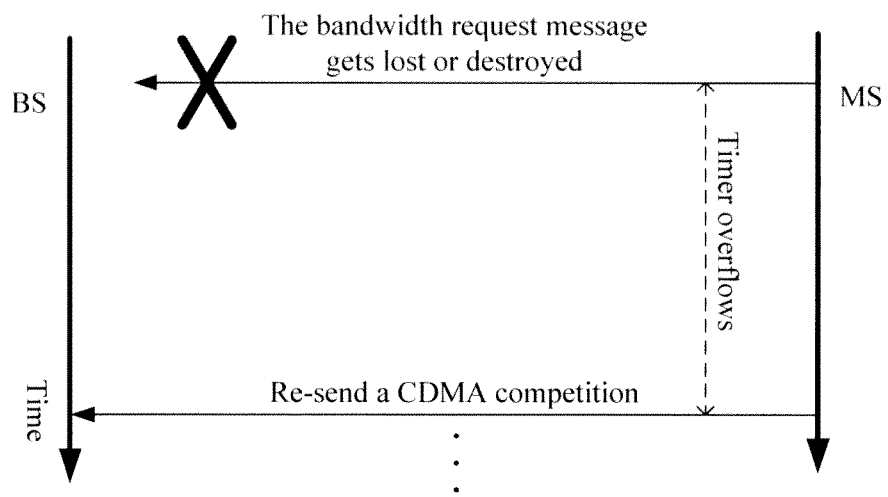
FIG. 8 shows an unnecessary latency before re-sending a bandwidth request.
Figure 9:
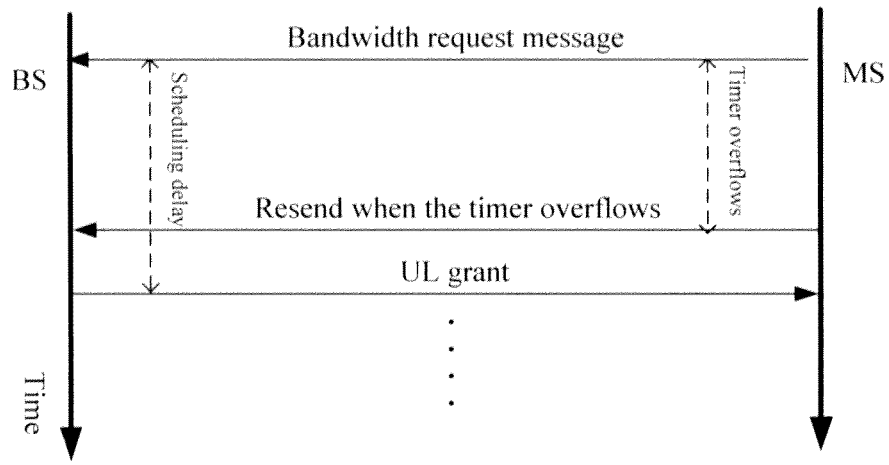
FIG. 9 shows a situation in which the overflow time of a timer is less than the scheduling delay of the base station.
Figure 10:
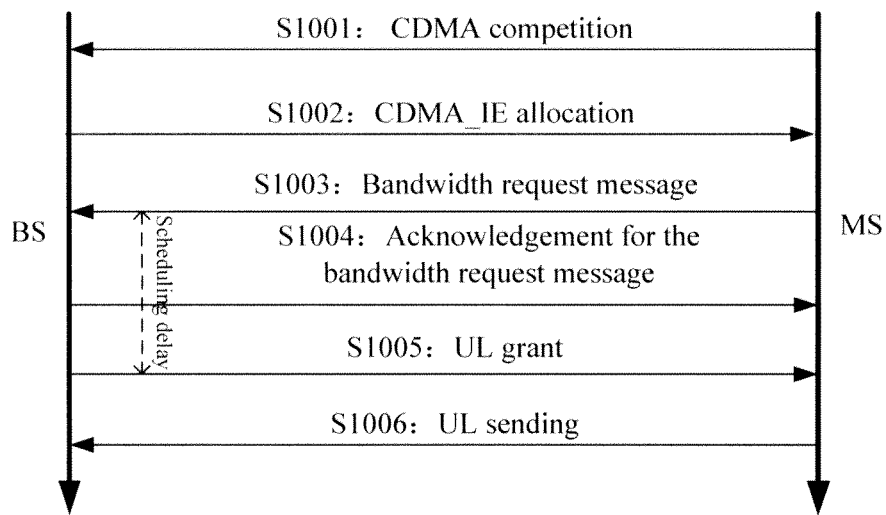
FIG. 10 shows a procedure for acknowledging the bandwidth request according to the non-patent document 1.

FIG. 6 shows a bandwidth request/grant procedure according to an embodiment of the present invention. The procedure is similar to a conventional procedure, and the difference is that the mobile station 200 needs to check the ACK information embedded in the UL-MAP, and that there is no requirement to judge whether the timer overflows.

At step S601, the mobile station 200 first sends a bandwidth request according to a procedure identical with the conventional procedure. At step S602, at the desired point of time (e.g., next frame), the mobile station 200 checks the UL-MAP to see whether the desired point of time is relevant to the base station procedure and whether the base station notifies the mobile station.

Then at step S603, the mobile station 200 searches the UL-MAP IE unit directed to it, and at step S604 judges whether its own UL-MAP IE unit can be obtained. If the mobile station 200 cannot find the UL-MAP IE directed to it, at step S605 it knows that the bandwidth request gets lost. The mobile station will immediately re-send a bandwidth request, thereby substantially reducing the latency.

If the mobile station obtains the UL-MAP IE unit allocated to it, the mobile station 200 knows that the base station has already correctly received the bandwidth request. Therefore, the mobile station will not attempt to send a bandwidth request avoid redundant repeated request. Then, the detecting unit of the mobile station 200 detects, at step S606, whether the resource allocated in the UL-MAP IE is 0. If the size of the resource is 0, this means that the base station 100 does not allocate resource to the mobile station in the frame though the base station has already correctly received the bandwidth request. The base station will allocate resource to the mobile station in subsequent frames according to the scheduling scheme. At step S607, the mobile station 200 waits for the coming of subsequent frames and repeats the UL-MAP check. At step S608, when the mobile station 200 obtains the UL-MAP IE having a valid bandwidth allocation, the transceiving unit 210 of the mobile station 200 sends the to-be-sent data in the buffer 220 on the allocated time-frequency resource block.

As stated above, the above acknowledgement enables the mobile station to know as early as possible that the bandwidth request gets lost and to restart to send a request. Therefore, the mobile station can quickly restore from the failed bandwidth request. As compared with the conventional procedure, the procedure according to the present invention exhibits a substantially reduced latency before resending a bandwidth request.

In addition, the above solution can carry extra acknowledgement information besides bandwidth allocation (UL-MAP IE). This does not need to define any new message or signaling for the acknowledge procedure, and therefore supports backward compatibility.

When the base station decides to respond to the mobile station's request and immediate allocate resource, it does not need to send any extra acknowledgment information. Only when needed, e.g., when the base station correctly receives the request but does not allocate resource immediately, the base station sends an acknowledgement for the bandwidth request. This solution substantially reduces the overhead.

In the acknowledgement procedure set forth in the non-patent document 1, since the base station has to consume resource to respond to each bandwidth request, this causes a relatively large overhead. In contrast, the above solution according to the embodiment of the present invention uses acknowledgement for the bandwidth request. The base station makes an acknowledgement only when needed. Therefore, the overhead is less. Besides, the solution according to the embodiment of the present invention allows for the embedding of extra acknowledgement information in the bandwidth allocation, and does not need to define any new message or signaling and therefore support backward compatibility.

Although the above description relates to the bandwidth request and acknowledgment between the base station and the mobile station, the above solution can also be applied to cases of application and allocation of resource between for example BS-RS, RS-MS, and BS-FemtoBS.

The present invention is illustrated and described in detail with reference to the above exemplary embodiments, but it is not limited to the embodiments. Those having ordinary skill in the art should appreciate various modifications to form and details should not depart from the spirit and scope of the present invention as defined in the appended claims.

What is claimed is:

1. A method of requesting a resource from a resource allocating apparatus by a resource requesting apparatus, comprising:

receiving a resource request message;

if the resource cannot be allocated within a set time interval with respect to the resource requesting apparatus, sending an acknowledgement for the resource request message from the resource allocating apparatus to the resource requesting apparatus, wherein if the resource requesting apparatus receives the acknowledgement for the resource request message sent by the resource allocating apparatus to the resource requesting apparatus in the set time interval, the resource requesting apparatus waits for resource allocation from the resource allocating apparatus, wherein if the resource cannot be allocated within the set time interval with respect to the resource requesting apparatus, the acknowledgement for the resource request message is sent from the resource allocating apparatus to the resource requesting apparatus by virtue of a bandwidth allocation (UL grant), wherein if the resource cannot be allocated to the resource requesting apparatus within the set time interval, a value in a specific field of the UL grant sent by the resource allocating apparatus is set to indicate that the size of the resource in the UL grant is 0; and if the resource is allocated to the resource requesting apparatus within the set time interval, not sending the acknowledgement for the resource request message from the resource allocating apparatus to the resource requesting apparatus.

2. The method according to claim 1, wherein if the resource requesting apparatus does not receive a valid resource allocation or the acknowledgement for the resource request message sent by the resource allocating apparatus in the set time interval, the resource requesting apparatus begins to re-send a request for resource.

3. The method of claim 1 wherein the resource requesting apparatus detects whether a value indicative of the size of the resource in the bandwidth allocation (UL grant) is 0, and the resource requesting apparatus waits for the resource allocation from the resource allocating apparatus if the value indicative of the size of the resource is 0.

4. A resource allocating apparatus, comprising:
a transceiving unit for receiving a resource request message from a resource requesting apparatus;
a resource scheduling and allocating unit for judging whether to allocate a resource to the resource requesting apparatus within a set time interval after the transceiving unit receives the resource request message; and
an acknowledgement message generating unit for generating a message acknowledging the resource request message if the resource cannot be allocated to the resource requesting apparatus in the set time interval, wherein the acknowledgement message generating unit forwards the message acknowledging the resource request message to the transceiving unit, which then forwards the message to the resource requesting apparatus,
wherein the acknowledgement message generating unit generates the message for acknowledging by virtue of a UL grant if the resource cannot be allocated within the set time interval with respect to the resource requesting apparatus, and
wherein a value in a specific field of the UL grant is set to indicate that the size of the resource in the UL grant is 0 if the resource cannot be allocated to the resource requesting apparatus within the set time interval.

5. A resource allocating apparatus according to claim 4, the resource allocating apparatus being implemented in a communication system comprising a resource requesting apparatus comprising a transceiving unit for sending a resource request message and receiving a message from a resource allocating apparatus and, a detecting unit for detecting whether the received message meets predetermined conditions, wherein the resource requesting apparatus waits for a resource allocation result from the resource allocating apparatus when the detection result indicates the received message meets the predetermined conditions.

6. A resource requesting apparatus, comprising:
a transceiving unit for sending a resource request message and receiving a message from a resource allocating apparatus; and
a detecting unit for detecting whether the received message meets predetermined conditions, wherein predetermined conditions include at least that a value of the received message indicates that the resource allocating apparatus has successfully received the resource request message sent by the resource requesting apparatus and the resource allocating apparatus has determined resource cannot be allocated within a set time interval in response to the resource request message,
wherein the resource requesting apparatus waits for a resource allocation result from the resource allocating apparatus when the detection result indicates the received message meets the predetermined conditions,
wherein if the resource requesting apparatus does not receive a valid resource allocation or an acknowledgement for the resource request message sent by the resource allocating apparatus to the resource requesting apparatus in the set time interval, the resource requesting apparatus begins to re-send the resource request message,
wherein the detecting unit of the resource requesting apparatus detects whether the value of the received message indicative of the size of the resource in a bandwidth allocation (UL grant) is 0, and the resource requesting apparatus waits for the resource allocation from the resource allocating apparatus if the value indicative of the size of the resource is 0.

7. The resource requesting apparatus according to claim 6, wherein if the resource requesting apparatus receives the acknowledgement for the resource request message sent by the resource allocating apparatus to the resource requesting apparatus in the set time interval, the resource requesting apparatus waits for resource allocation from the resource allocating apparatus.

8. The resource requesting apparatus according to claim 6, wherein the resource at least comprises bandwidth.

* * * * *